United States Patent [19]
Wang

[11] Patent Number: 5,890,382
[45] Date of Patent: *Apr. 6, 1999

[54] MULTISHAFT COMBINATION LOCK

[76] Inventor: Kenneth Wang, 3856 Udell Ct., Los Angeles, Calif. 90027

[ * ] Notice: The term of this patent shall not extend beyond the expiration date of Pat. No. 5,701,772.

[21] Appl. No.: 782,880

[22] Filed: Jan. 14, 1997

Related U.S. Application Data

[62] Division of Ser. No. 647,765, May 15, 1996, Pat. No. 5,701,772.

[51] Int. Cl.$^6$ .............................. E05B 13/10; B60R 25/02
[52] U.S. Cl. .................................. 70/209; 70/226; 70/238
[58] Field of Search ..................... 70/32, 34, 23, 70/312, 276, 164, 284, 285, 156, 33, 209–211, 237, DIG. 57; 248/188.5, 553; 292/288, 289, 338, 339, 3, DIG. 46

[56] References Cited

U.S. PATENT DOCUMENTS

| | | | |
|---|---|---|---|
| 1,448,658 | 3/1923 | Furber | 70/211 |
| 4,184,277 | 1/1980 | Larin | 70/276 |
| 4,236,395 | 12/1980 | Avaiusini . | |
| 4,295,676 | 10/1981 | Smith | 292/DIG. 46 |
| 4,318,559 | 3/1982 | Burton | 292/DIG. 46 |
| 4,459,832 | 7/1984 | Avrea et al. . | |
| 4,572,557 | 2/1986 | Taylor | 292/DIG. 46 |
| 4,576,021 | 3/1986 | Holden . | |
| 4,616,492 | 10/1986 | Barfield . | |
| 4,671,088 | 6/1987 | Jeang . | |
| 4,751,831 | 6/1988 | Morris, Jr. et al. . | |
| 4,826,225 | 5/1989 | Styles | 292/332 |
| 5,024,069 | 6/1991 | Hull, Jr. et al. | 70/209 |
| 5,031,429 | 7/1991 | Wang | 70/209 |
| 5,127,689 | 7/1992 | Jarvis | 292/339 |
| 5,142,889 | 9/1992 | Liu | 70/209 |
| 5,174,138 | 12/1992 | Shen | 70/209 |
| 5,193,865 | 3/1993 | Allenbaugh | 292/DIG. 46 |
| 5,297,406 | 3/1994 | Lin | 70/209 |
| 5,372,023 | 12/1994 | Huang | 70/247 |
| 5,383,344 | 1/1995 | Zambell | 70/209 |
| 5,405,113 | 4/1995 | Jaw | 70/233 |
| 5,409,077 | 4/1995 | Ball | 70/209 |
| 5,435,158 | 7/1995 | Ta-Yung | 70/209 |
| 5,471,855 | 12/1995 | Wu | 70/209 |
| 5,557,957 | 9/1996 | Wyman | 70/237 |
| 5,653,132 | 8/1997 | Coto | 70/237 |

FOREIGN PATENT DOCUMENTS

| | | | |
|---|---|---|---|
| 8936163 | 12/1990 | Australia | 70/209 |
| 695313 | 12/1930 | France | 70/211 |

*Primary Examiner*—Steven Meyers
*Assistant Examiner*—Teri Pham
*Attorney, Agent, or Firm*—Christensen O'Connor Johnson & Kindness PLLC

[57] ABSTRACT

A multishaft combination lock includes a lock body, an alignment sleeve, and a detachable pin. The alignment sleeve has a hole and is rotatably coupled to the lock body to provide access into the lock body. The alignment sleeve has an angled cutout at a first end, with the alignment of the cutout being adjusted by rotating the alignment sleeve. The detachable pin has a floating bushing that can be misaligned with the principle axis of the detachable pin. To lock the multishaft combination lock, the lock body is fitted to the detachable pin through the hole of the alignment sleeve with the floating bushing misaligned with the angled cutout. When the detachable pin is fully inserted into the lock body, the floating bushing is positioned beyond the end of the alignment sleeve within the lock body and becomes misaligned or offset with the alignment sleeve. To unlock the lock, the alignment sleeve is rotated so that the angled cutout is aligned with the floating bushing of the detachable pin. When the detachable pin is withdrawn from the lock body, the cutout of the alignment sleeve causes the floating bushing to become aligned with the alignment sleeve, thereby allowing the detachable pin to be removed.

20 Claims, 10 Drawing Sheets

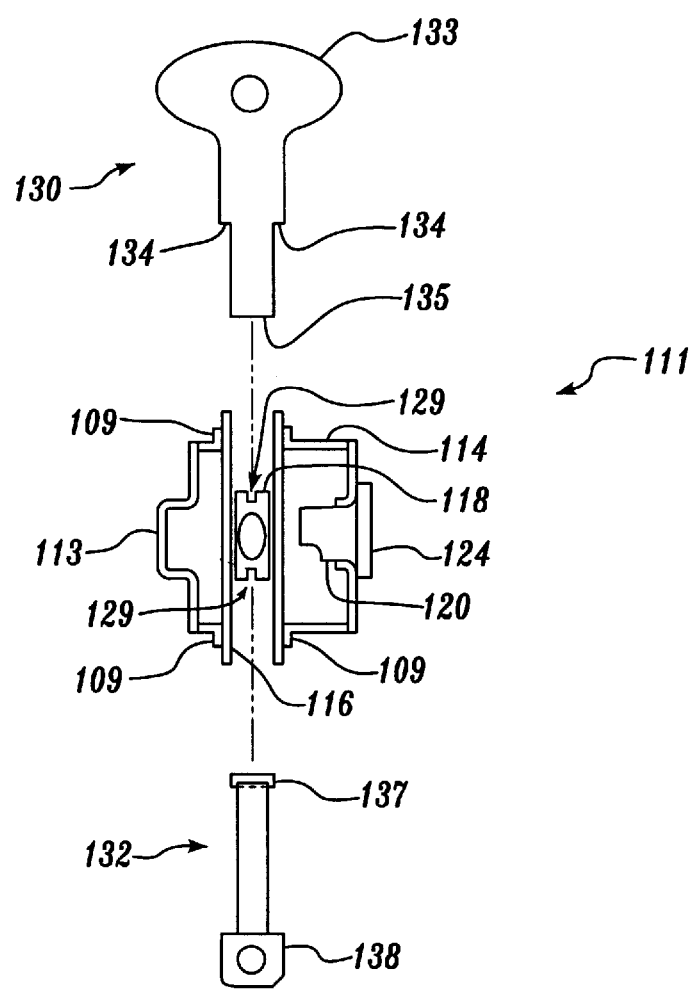

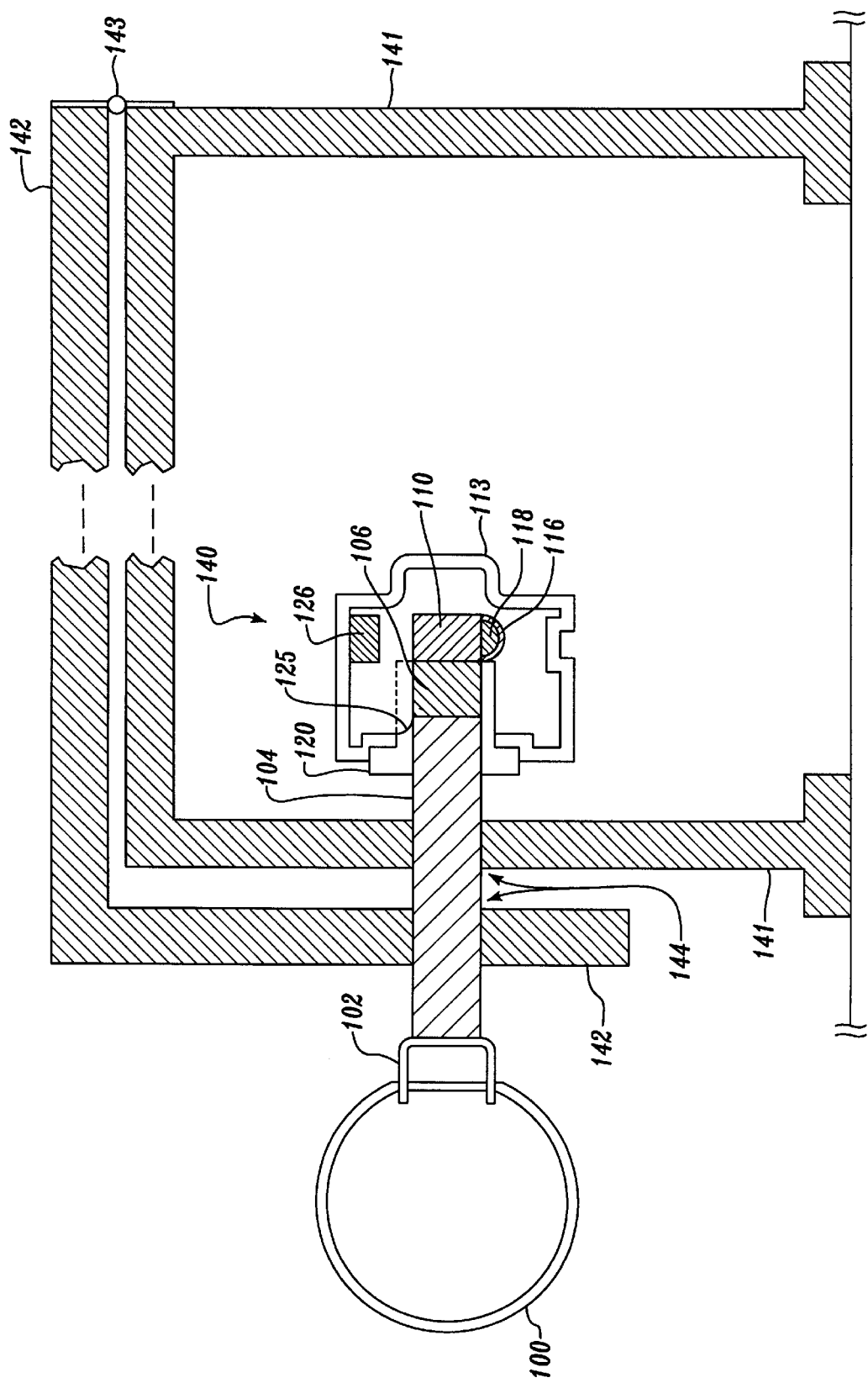

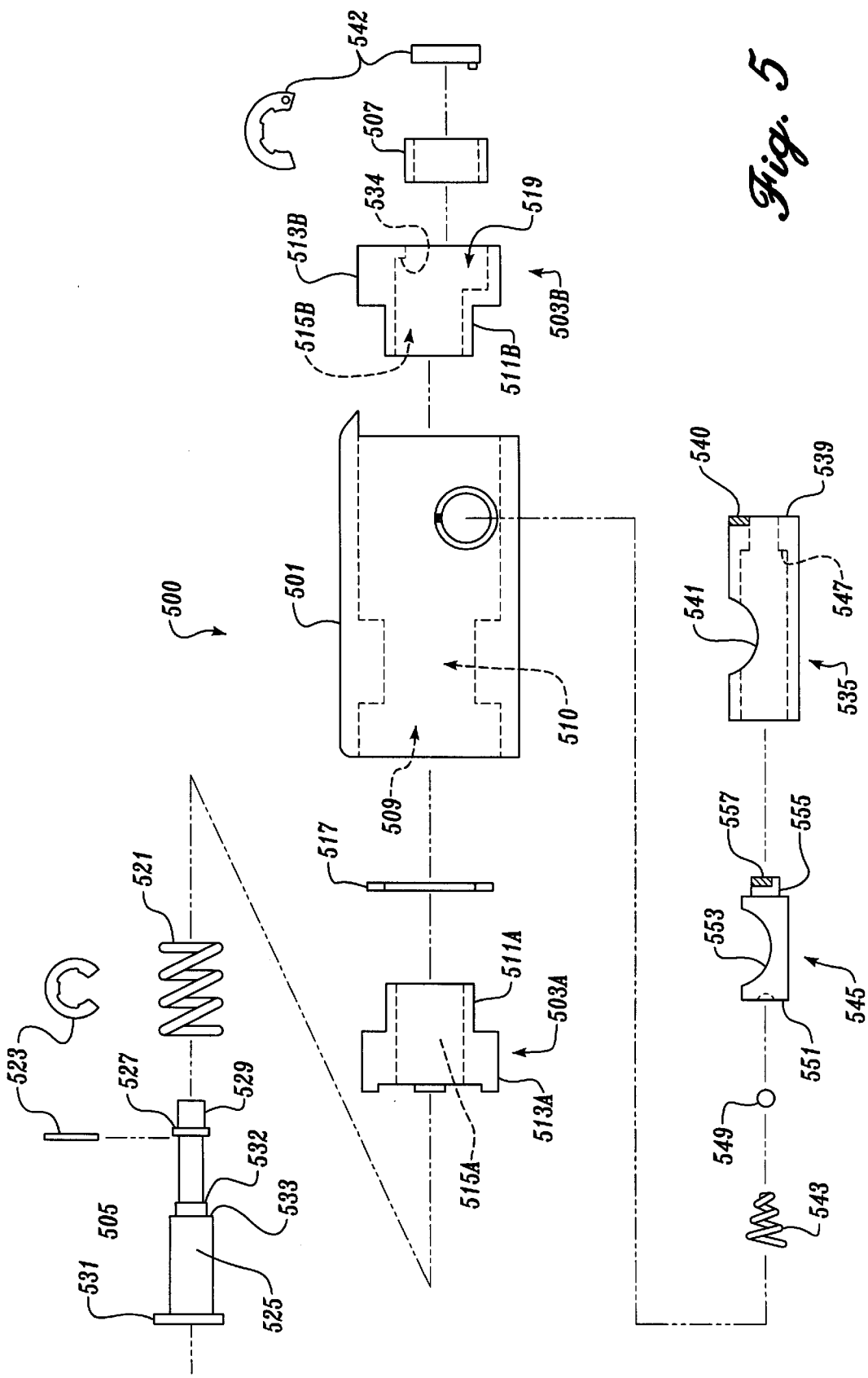

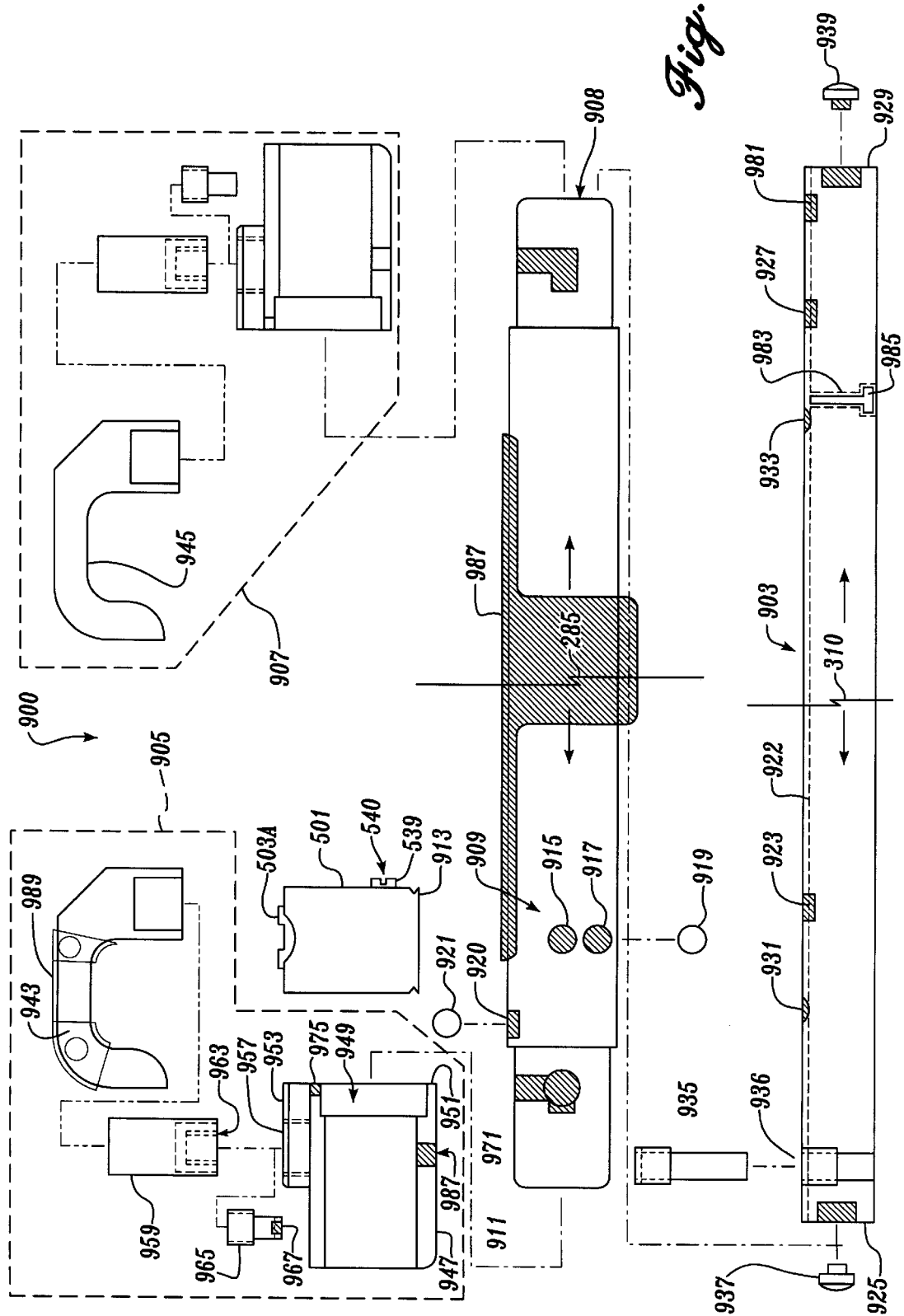

MULTISHAFT COMBINATION LOCK

This is a divisional of the prior application Ser. No. 08/647,765, filed May 15, 1996, issued as Pat. No. 5,701,772 the benefit of the filing date of which are hereby claimed under 35 U.S.C. § 120.

FIELD OF THE INVENTION

This invention relates to combination locks and, more particularly, to combination locks with a lock shaft separate from the lock body for locking objects of various shapes in either a dynamic or static state.

BACKGROUND OF THE INVENTION

The development of the conventional combination lock can be traced back to the "letter-lock" used in England at the beginning of the seventeenth century. The letter lock contained a number of rings, each ring being marked with letters and having a slot. A spindle was threaded through the rings. When the rings were rotated so that a particular word was formed, the slots on the rings would line up. The spindle could then be drawn through the slot, and the lock could be opened. Later in the nineteenth century, the combination lock evolved to include tumblers, pins and arms.

However, current conventional combination locks have not changed in that these combination locks still require a body to house a series of tumblers with connected pins. These tumblers, pins and arms generally cause the combination lock to have a relatively large number of internal parts and increase the complexity of fabrication and assembly. In addition, these conventional combination locks typically have applications limited to locking large stationary objects, for example, lockers, gates, and garage doors because typical general purpose combination locks have relatively massive lock bodies to accommodate tumblers or levers. Further, typical conventional combination locks are loosely fitted onto the object to be locked and, thus, are not suitable for locking moving objects. Moreover, typical conventional combination locks are large and are not suitable for use in small spaces.

For example, conventional combination locks are not suitable for use in typical automobile steering wheel locks (e.g., The Club®). Consequently, these steering wheel locks generally use conventional key locks that are fixed in the steering wheel lock. These key locks are intended to be permanently attached to the steering wheel lock. Thus, if the key lock of a steering wheel lock is damaged, it cannot be easily replaced. Moreover, a conventional tumbler-type key lock has pins that can be sheared relatively easily because the pins are typically relatively small in diameter. Further, the key hole provides relatively easy access for tools used in shearing these pins.

When not in use, these conventional steering wheel locks typically must be removed from the steering wheel to drive the automobile. The length, shape and mass of these steering wheel locks make them inconvenient and cumbersome to store while driving the car. In addition, each time the user wants to lock the steering wheel, the user must locate the steering wheel lock and perform the cumbersome process of mounting it on the steering wheel.

SUMMARY OF THE INVENTION

In accordance with the present invention, a multishaft combination lock is provided. In one embodiment, the combination lock includes a lock body, an alignment sleeve, and a detachable pin. The alignment sleeve has a hole and is rotatably coupled to the lock body to provide access into the lock body. The alignment sleeve has an angled cutout at a first end, with the alignment of the cutout being adjusted by rotating the alignment sleeve. The detachable pin has a floating bushing that can be misaligned with the principle axis of the detachable pin. To lock the multishaft combination lock, the lock body is fitted to the detachable pin through the hole of the alignment sleeve with the floating bushing misaligned with the angled cutout. When the detachable pin is fully inserted into the lock body, the floating bushing is positioned beyond the end of the alignment sleeve within the lock body and becomes misaligned or offset with the alignment sleeve.

To unlock the lock, the alignment sleeve is rotated so that the angled cutout is aligned with the floating bushing of the detachable pin. When the detachable pin is withdrawn from the lock body, the cutout of the alignment sleeve causes the floating bushing to become aligned with the alignment sleeve, thereby allowing the detachable pin to be removed. In contrast, when the lock is in the locked state, the cutout of the alignment sleeve is misaligned with the floating bushing of the detachable pin. As a result, the floating bushing remains misaligned with the alignment sleeve when the user attempts to withdraw the detachable pin from the lock body, thereby locking the detachable pin within the lock body.

This embodiment has relatively few parts and is compact in size, compared to conventional combination locks. Thus, this embodiment is simpler and less costly to fabricate and assemble. In addition, the compact size of this embodiment allows the lock to be used in many applications with limited space.

In a second embodiment, the lock further includes a combination pin disposed proximate to and crossing a plane containing the longitudinal axis of the detachable pin. The combination pin has a cutout that can be aligned with the detachable pin by rotating the combination pin about and/or translating the combination pin along its longitudinal axis. When the cutout is misaligned with the detachable pin, the combination pin causes the floating busing to be misaligned with the longitudinal axis of the detachable pin. However, when the cutout is aligned with the detachable pin, the cutout allows the floating bushing to be aligned with the longitudinal axis of the detachable pin, thereby allowing the detachable pin to be removed as described above in the first embodiment. The combination pin adds further combinations, which helps make the lock more secure.

In a third embodiment similar to the second embodiment described above, the detachable pin is sized so that it extends beyond the lock body when the lock is in the locked condition and into a hole of the object to be locked. In addition, the lock includes an alignment sleeve with an offset cavity instead of an angled cutout. The offset cavity is offset relative to the hole in the alignment sleeve and is sized to receive the floating bushing. When the combination pin is disposed into a locked position (i.e., the cutout of the combination pin is misaligned with the detachable pin), it prevents the floating bushing from being aligned with the offset cavity. On the other hand, when the cutout in the combination pin is aligned with the detachable pin and the alignment sleeve is rotated so that the offset cavity is aligned with the cutout in the combination pin, the lock is in the unlocked condition. The detachable pin can then be withdrawn so that the floating bushing enters the offset cavity and, as a result, no longer extends into the hole in the object to be locked. However, in this embodiment, the detachable pin cannot be removed from the lock body. This embodiment can be advantageously used in a steering wheel lock because the detachable pin is relatively thick in diameter and, consequently, is less vulnerable to being sheared unlike the pins in conventional key locks that are used in typical steering wheel locks. Further, this embodiment greatly reduces access to tools that can be used to shear the detachable pin.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 illustrates a key and push pin used in operating a multishaft combination lock according to one embodiment of the present invention;

FIGS. 4A and 4B are vertical cross-sections of a combination lock according to one embodiment of the present invention used to lock a vehicle rack;

FIG. 5 is an exploded view of a combination lock according to another embodiment of the present invention;

FIG. 9 is an exploded view of a steering wheel locking device using the combination lock depicted in FIG. 8, according to one embodiment of the present invention;

DETAILED DESCRIPTION OF THE PREFERRED EMBODIMENT

Figure 1:
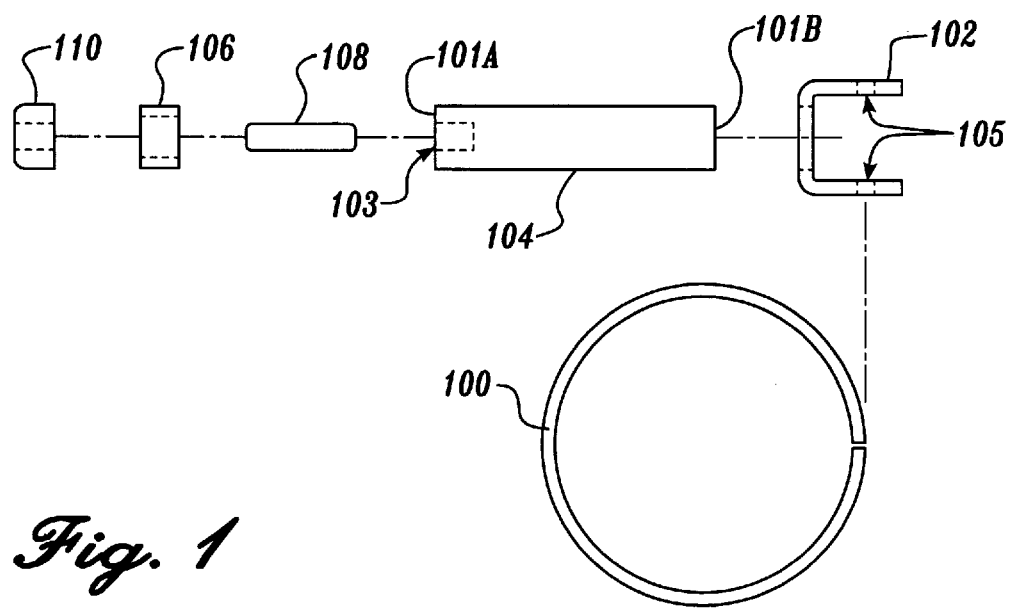
FIG. 1 is an exploded view of a detachable pin according to one embodiment of the present invention.

FIG. 1 shows an exploded view of one embodiment of a detachable pin 104 according to the present invention. Detachable pin 104 has a hole 103 (shown in phantom) at a first end 101A. The dimensions of hole 103 are roughly 6 mm (depth)×7 mm (diameter). The dimensions of detachable pin 104 are roughly 45 mm (length)×8 mm (diameter). Detachable pin 104 includes a jam pin 108 fitted and welded to hole 103 in detachable pin 104. The dimensions of jam pin 108 are roughly 11 mm (length)×4 mm (diameter). Detachable pin 104 includes a floating bushing 106, which is fitted onto jam pin 108. The dimensions of floating bushing 106 are roughly 8 mm (outer diameter)×7 mm (inner diameter) ×5 mm (length). Because floating bushing 106 has a larger inner diameter than the diameter of jam pin 108, floating bushing 106 can be misaligned or offset with respect to detachable pin 104. Detachable pin 104 also includes a fixed bushing 110 that is fixedly attached to the end of jam pin 106, thereby confining floating bushing 106 on jam pin 108 between fixed bushing 110 and first end 101A of detachable pin 104. The dimensions of fixed bushing 110 are roughly 8 mm (outer diameter)×4 mm (inner diameter)×5 mm (length).

At the second end 101B of detachable pin 104, a lock ring base 102 is fitted and welded to detachable pin 104. Lock ring base 102 is stamped and formed into a "U" shape and includes a hole 105 (shown in phantom) on each "arm" of the "U". Each hole 105 is roughly 4 mm (diameter), and is located roughly 4 mm from the vertical center line and roughly 4 mm from the base of the "U". Lock ring base 102 also includes a hole 107 (shown in phantom) on the base of the "U", and hole 107 is roughly 8 mm (diameter). Hole 107 is located at the center of the base. The overall dimensions of lock ring base 102 are roughly 18 mm (width)×16 mm (height)×14 mm (depth)×1.5 mm (thickness). Detachable pin 104 also includes a lock ring 100 that is spliced, with the ends of lock ring 100 fitted through holes 105 of lock ring base 102. Lock ring 100 has dimensions of roughly 4 mm (wire diameter)×35 mm (ring diameter). Detachable pin 104 is attached to the lock body (described below in conjunction with FIGS. 2A–2C).

Figure 2A:
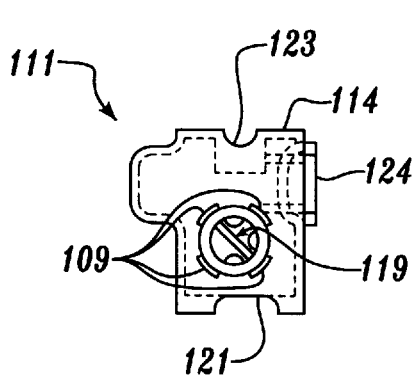
FIGS. 2A, 2B and 2C respectively are a side view of a lock body according to one embodiment of the present invention, an end view of the lock body and an exploded view of the lock body.
Figure 2B:
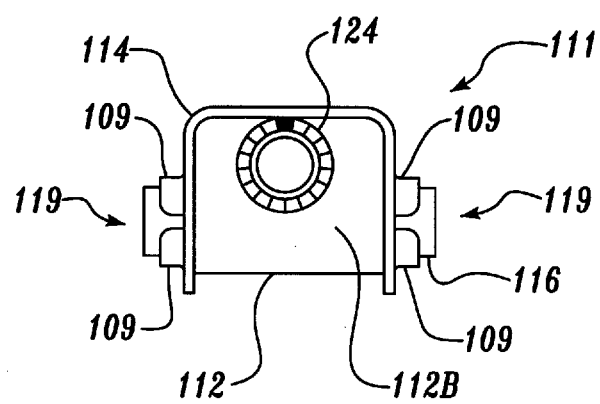
Figure 2C:
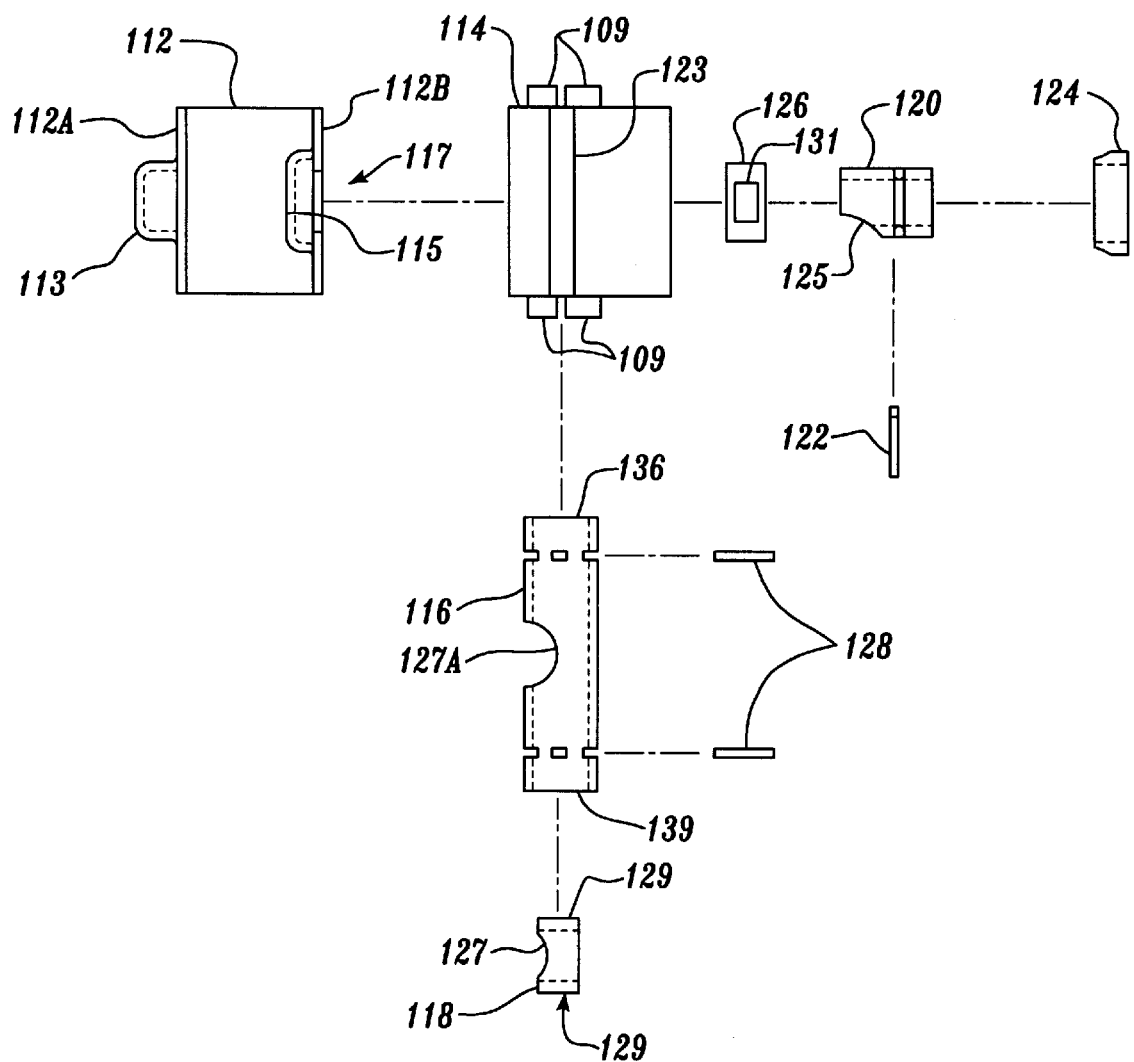

FIGS. 2A–2C show a lock body 111 according to one embodiment of the present invention. More specifically, FIGS. 2A and 2B respectively show side and end views of lock body 111. Lock body 111 includes a "U" shaped detachable housing 112 that is stamped and formed from sheet metal, roughly 1.5 mm in thickness. On a first side 112A of "U" shaped detachable housing 112 there is a convex protrusion 113 roughly 8 mm (diameter)×4 mm (height) (see FIG. 2C). The center of convex protrusion 113 is located on the vertical center line of the first side and is 8 mm from the top edge of "U" shaped detachable housing 112. On a second side 112B of "U" shaped detachable housing 112, there is a concave area 115. The dimensions of concave area 115 are roughly 14 mm (diameter)×5 mm (depth). Concave area 115 and convex protrusion 113 share a common center line. At the center of concave area 115, there is a hole 117 roughly 11 mm (diameter). The overall dimensions of "U" shaped detachable housing 112 are roughly 28 mm (width)×19 mm (height)×21 mm (depth).

Lock body 111 also includes an inverted "U" shaped combination pin housing 114 that is stamped and formed from sheet metal roughly 1.5 mm in thickness. "U" shaped combination pin housing 114 includes a pair of holes 119 roughly 10 mm (diameter) stamped into each side of the "U". Each hole 119 has four pieces of sheet metal 109 that are folded normal from each side of "U" shaped combination pin housing 114. Each piece 109 has numbers and marks stamped onto the surface of the piece. Each piece 109 is semicircularly shaped, roughly 12 mm in diameter. The four pieces 109 are equally spaced at 90 degrees apart. The holes 119 are respectively located roughly 7 mm from the side edge of each are of the "U" and 15 mm each from the top surface of "U" shaped combination pin housing 114. As shown in FIG. 2A, at the bottom edges of the "U", there are a pair of rectangular cutouts 121, roughly 11 mm (length)×3 mm (height). Cutouts 121 are located roughly 11 mm from the side of the edges. FIG. 2A also shows a cylindrical concave area 123 stamped on the top surface of "U" shaped combination pin housing 114, roughly 28 mm (length)×6 mm (width). Concave area 123 runs across the top surface of "U" shaped combination pin housing 114, and is roughly 5 mm from the edge. The overall dimensions of "U" shaped combination pin housing 114 are roughly 36 mm (width)×22 mm (depth)×24 mm (height).

FIG. 2C shows an exploded view of lock body 111. Lock body 111 includes an alignment sleeve 120. Alignment sleeve 120 is cylindrical in shape with a angled cutout 125 at a first end. Angled cutout 125 is roughly 4 mm (height)×6 mm (length). Alignment sleeve 120 also has a groove roughly 3 mm behind angled cutout 125, roughly 0.7 mm (width)×1 mm (depth). The overall dimensions of alignment sleeve 120 are roughly 11 mm (outer diameter)×8 mm (inner diameter)×13 mm (length). Alignment sleeve 120 includes a combination dial 124 that is fitted and welded at a second end of alignment sleeve 120. Combination dial 124 is cylindrical in shape and tapered at a first end. At the other end, combination dial 124 is flat forming a lip, with markers stamped on the flat surface of the second end (see FIG. 2B). The overall dimensions of combination dial 124 are roughly 13 mm (outer diameter)×11 mm (inner diameter)×5 mm (length).

The first end of alignment sleeve 120 is fitted through hole 117 of the second side of "U" shaped detachable housing 112. A sleeve retainer ring 122 is fitted in the groove of alignment sleeve 120 to fix alignment sleeve 120 to "U" shaped detachable housing 112.

A cylindrical housing 116 is fitted and welded to the pair of holes 119 in "U" shaped combination pin housing 114. The ends of cylindrical housing 116 extend beyond combination pin housing 114 and include a triangular cut at each end. Each triangular cut is formed by three cuts roughly 120 degrees apart and 2.0 mm deep. At the center of cylindrical housing 116, there is a semicircular cutout 127A, with a radius of roughly 5 mm. The overall dimensions of cylindrical housing 116 are roughly 40 mm (length)×10 mm (diameter). A combination pin 118 is fitted inside cylindrical housing 116 and held within cylindrical housing 116 by retainer clips 128 fitted into the triangular cuts at the ends of cylindrical housing 116. Combination pin 118 is cylindrical in shape with a semicircular cutout 127 roughly 4.5 mm (radius)×1.5 mm (depth). In addition, combination pin 118 has a slot 129 (shown in phantom) cut into each end of combination pin 118. The dimensions of each slot 129 are roughly 1 mm (width)×1.5 mm (depth). The relative angular and horizontal positions of semicircular cutout 127 is varied to form different combinations.

Lock body 111 includes a semicircular magnetic shoe 126 that is stamped and formed from magnetized sheet metal. Magnetic shoe 126 has a cutout 131 stamped at the top of magnetic shoe 126. The dimensions of cutout 131 are roughly 5 mm (width)×3 mm (length). Cutout 131 of magnetic shoe 126 is bonded to concave area 123 across the top surface of "U" shaped combination pin housing 114. "U" shaped detachable housing 112 and "U" shaped combination pin housing 114 are welded together to form a six sided rectangular shaped figure.

FIG. 3 shows a key 130 and push pin 132 for use with lock body 111. Key 130, stamped from sheet metal of roughly 0.7 mm (thickness), is used in conjunction with combination pin 118. Key 130 is rectangular in shape, having a first end 133 rounded with a hole roughly 5 mm (diameter) at the center. Key 130 has a second end 135 that is rectangular with a pair of steps 134 on both sides of the key. Each step 134 is roughly 2 mm in depth. The length of steps 134 determine a part of the lock combination when fitted into an end 136 of cylindrical housing 116. The overall dimensions of key 130 are roughly 30 mm (length)×9 mm (section width). In addition, push pin 132, cylindrical in shape, is used in conjunction with key 130 and combination pin 118. Push pin 132 has a first end 137 that is blade shaped, and a second end 138 that is "U" shaped with a hole roughly 5 mm (diameter) at the center. In operation, first end 137 of push pin 132 is inserted into cylindrical housing 116 at end 139.

Figure 4A:
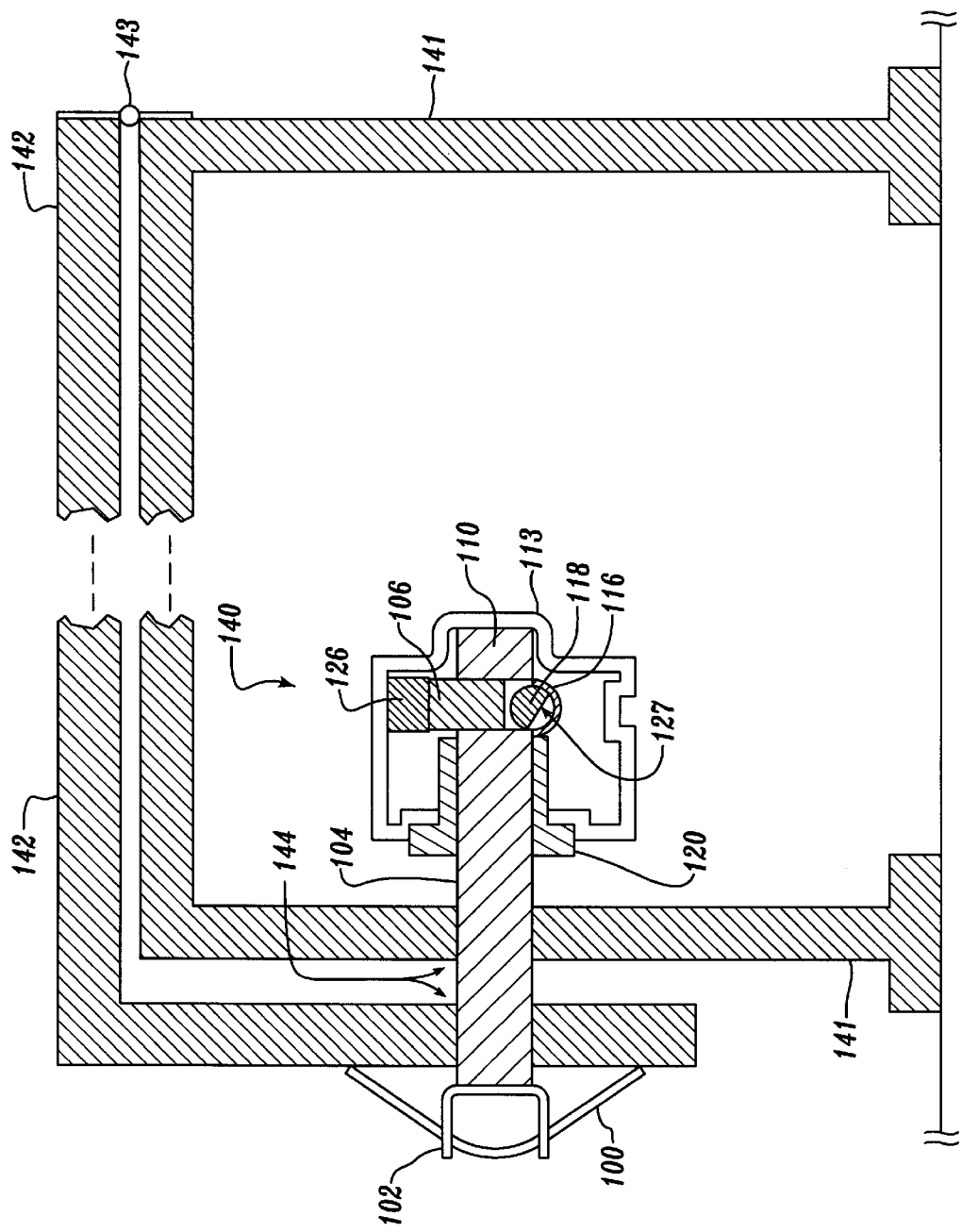

FIGS. 4A and 4B respectively show side cross-sectional views of one embodiment of a locked and unlocked, fully assembled multishaft combination lock 140 according the present invention. In this embodiment, multishaft combination lock 140 is locking a vehicle rack that includes a fixed member 141 and a hinged member 142 attached to fixed member 141 by a hinge 143. To lock multishaft combination lock 140, as shown in FIG. 3, first rotate lock body 111 into vertical position with end 136 of cylindrical housing 116 facing down, whereby gravity causes combination pin 118 to rest at end 136 of cylindrical housing 116. Next, insert key 130 into end 136 of cylindrical housing 116 so that end 135 of key 130 fits into slot 129 of combination pin 118. Next, rotate key 130 to align end 133 of key 130 with a designated marking on one of the marked pieces of combination pin housing 114. Because end 135 of key 130 is fitted to slot 129 of combination pin 118, rotating end 131 of key 130 will align semicircular cutout 127 on combination pin 118 with the opening of detachable housing 112. Referring back to FIG. 4A, insert detachable pin 104 into holes 144 in the object to be locked (i.e., member 141 and hinged member 142). Next, fit lock body 111 over detachable pin 104 so that detachable pin housing 112 of lock body 111 contains fixed bushing 110 and floating bushing 106. This will place floating bushing 106 beyond alignment sleeve 120. Next, rotate key 130 one half turn to ensure that floating bushing 106 is in contact with the magnetic shoe 126. The magnetic force provided by magnetic shoe 126 causes floating bushing 106 to magnetically attach to magnetic shoe 126, thereby offsetting or misaligning floating bushing 106 with alignment sleeve 120. Hence, detachable pin 104 is locked in lock body 111 by floating bushing 106, which locks the object.

To unlock multishaft combination lock 140, as shown in FIG. 3, first insert pin pusher 132 at end 139 of cylindrical housing 116. Next, insert key 130 at end 136 of cylindrical housing 116 with steps 134 of key 130 flush against end 136 and end 135 of key 130 fitted to slot 129 of combination pin 118. This will align semicircular cutout 127 of combination pin 118 axially with floating bushing 106. Next, rotate key 130 to align end 133 with the designated marking on the piece of combination pin housing 114. Because key 130 is fitted to slot 129 of combination pin 118, rotating key 130 also rotates combination pin 118, thereby aligning semicircular cutout 127 of combination pin 118 in the angular position with floating bushing 106 (or cutout 127 may be about one hundred eighty degrees out of phase with floating bushing 106). Referring back to FIG. 4B, next, rotate combination dial 124 of alignment sleeve 120 to the designated marking on the flat surface of the second end of combination dial 124. This will position angled cutout 125 of alignment sleeve 120 with floating bushing 106 (which is offset from alignment sleeve 120 by magnetic shoe 126). Next, rotate lock ring 100 about ninety degrees. This will release the spring force on lock ring 100. Next, withdraw detachable pin 104. As detachable pin 104 is being withdrawn, angled cutout 125 of alignment sleeve 120 causes floating bushing 106 to detach floating bushing 106 from magnetic shoe 126 and center or align floating bushing 106 coaxially with alignment sleeve 120. As a result, detachable pin 104 can be removed to unlock the object. However, if detachable pin 104 remains locked to lock body 111, then combination pin 118 was positioned about one hundred eighty degrees out of phase with floating bushing 106. Thus, to remove detachable pin 104, rotate key 130 180 degrees and align end 133 of key 130 with the designated marking on the piece of combination pin housing 114. This will bring semicircular angled cutout 125 of alignment sleeve 120 in line with floating bushing 106. Next, withdraw detachable pin 104 from lock body 111. Accordingly, the object is unlocked.

FIG. 5 is an exploded view of a combination lock 500 according to another embodiment of the present invention. In this embodiment, the combination lock 500 includes a lock body 501, an alignment sleeve 503, a detachable pin 505 and a floating bushing 507. The lock body 501 is machined from steel into a roughly cylindrical shape with a hole 509 (shown in dashed lines) lengthwise through the lock body. The hole 509 is substantially cylindrical, but with portions of varying diameter (see FIG. 6). As shown in FIG. 6, the hole 509 has a coaxial but smaller diameter portion 510 in the interior of the hole 509. As a result, this smaller diameter portion 510 forms a flange-like structure in the interior of the hole 509. The lock body 501 is described further in conjunction with FIG. 6 below.

Referring back to FIG. 5, the alignment sleeve 503 is then fitted into the hole 509 of the lock body 501. More specifically, the alignment sleeve 503 has two pieces 503A and 503B, which are sized to have interior ends 511A and 511B, respectively, that smoothly and rotatably fit into the smaller diameter portion of the hole 509. The pieces 503A and 503B have exterior ends 513A and 513B, respectively, that are sized to smoothly and rotatably fit into the end portions of the hole 509. Consequently, the exterior ends 513A and 513B are too large to fit in the smaller diameter portion of the hole 509. The pieces 503A and 503B also have holes 515A and 515B (shown in dashed lines) completely through the pieces and substantially centered through the interior and exterior ends. The holes 515A and 515B are sized so that the detachable pin 505 can be slidably fitted through the holes.

The pieces 503A and 503B are disposed on opposite sides of the flange in the hole 509 and press fitted together at the interior ends 511A and 511B so that the holes 515A and 515B are aligned end-to-end to essentially form a single hole. As is known in the art of press fitting, the interior and exterior diameters of the interior ends 511A and 511B are sized so that when press fitted together, the pieces form a substantially unitary body that is relatively difficult to separate. Optionally, the interior end 511A of piece 503A may be fitted through a thrust plate 517 before being press fitted to piece 503B to allow the alignment sleeve 503 to rotate more smoothly within the lock body 501. The thrust plate 517 is disk shaped with a centered hole having a diameter large enough to receive the interior end 511A. Because the exterior ends 513A and 513B are too large to fit into the smaller diameter portion of the hole 509, the alignment sleeve 503 is securely but rotatably attached within the lock body 501.

The piece 503B has an offset cavity 519 formed in the exterior end 513B. In this embodiment, the offset cavity 519 is cylindrical having a longitudinal axis that is offset but substantially parallel with the longitudinal axis of the hole 515B. The offset cavity 519 has a diameter larger than the diameter of the hole 515B, with the hole 515B opening within the offset cavity 519. A portion of the inner surface of the offset cavity 519 is aligned with a portion of the inner surface of the hole 515B, as is more clearly shown in FIG. 7. Thus, the detachable pin 505 can be slidably fitted within the lock body 501 through the alignment sleeve 503.

Referring back to FIG. 5, in this embodiment the combination lock 500 also includes a helical spring 521, and a standard retainer 523, which are coupled to the detachable pin 505. The spring 521 is fitted over a shaft 525 of the detachable pin 505 before the detachable pin 505 is fitted into the alignment sleeve 503. The detachable pin 505 is then inserted into the alignment sleeve 503 and the floating bushing 507 is then fitted onto the shaft 525 from the exterior end of the piece 503B of the alignment sleeve 503. The floating bushing 507 has an outer diameter sized to fit into the offset cavity 519 when the floating bushing 507 is aligned with the offset cavity 519. The retainer 523 is attached to the shaft 525 between the floating bushing 507 and a flange 527 near the end 529 of the shaft 525 to retain the floating bushing 507 onto the detachable pin 505. In addition, the retainer 523 has a larger diameter than the diameter of the hole 515B, which help prevents the detachable pin 505 from being completely withdrawn from the lock body 501. The spring 521, disposed between the piece 503A of the alignment sleeve 503 and a flange 531 of the detachable pin 505, provides a force that tends to push the detachable pin 503 away from the lock body 501. As a result, the retainer 523 tends to push the floating bushing 507 against the piece 503B of the alignment sleeve 503. When the floating bushing 507 is aligned with the offset cavity 519, the retainer 523 tends to push the floating bushing 507 into the offset cavity 519.

The shaft 925 includes a step 532 that makes contact with the floating bushing 507 when the detachable pin is pushed into the lock body to lock the combination lock 500. Consequently, the step 532 pushes the floating bushing 507 out of the offset cavity 519, thereby facilitating the locking operation. To complete the locking operation, the alignment sleeve 503 is then rotated to misalign the floating bushing 507 with the offset cavity 519. In this embodiment, the shaft 525 also includes a step 533 that makes contact with a step 534 in the offset cavity 519 in the alignment sleeve piece 503B. The steps 534 and 533 serve to limit the distance that the detachable pin 505 can be inserted into the lock body 501.

The combination lock 500 also includes a cylindrical housing 535 that is press fitted into a hole 537 in the side of the lock body 501. In this embodiment, the hole 537 is substantially perpendicular to and intersects the hole 509, but does not pass completely through the lock body 501. An end 539 of the cylindrical housing 535 extends slightly out of the hole 537 and includes a notch 540. The notch is used for aligning a key (not shown) similar to the key 130 (FIG. 3).

The cylindrical housing 535 includes a semicircular cutout 541 positioned so that the cutout 541 is aligned with the offset cavity 519. More specifically, the inner surface of the cutout 541 matches up with a portion of the inner surface of the offset cavity 519. The cutout 541 is sized to fit to the floating bushing 507. As a result, the floating bushing 507, when aligned with the cutout 541, can freely slide along the inner surface of the cutout 541 and the offset cavity 519 when the detachable pin 505 is longitudinally moved within the lock body 501. A retainer 542 is press fitted into the hole 509 of the lock body 501 and aligned above the cylindrical housing 535. The retainer 542 is thick enough to extend into the hole 509 of the lock body 501 so that the floating bushing 507 cannot be aligned with the offset cavity 519 when the offset cavity is misaligned with the cutout 541. Further, a protrusion on the retainer 542 may be fitted to a slot on the cylindrical housing 535 to help prevent the cylindrical housing 535 from rotating within the lock body 501.

A cone shaped spring 543 is disposed within the cylindrical housing 535 with the narrower end of the spring 543 pointing toward the end 539 of the cylindrical housing 535. The cylindrical housing 535 has an interior flange 547 at the end 539. A combination pin 545 is then press fitted into the cylindrical housing 535 past the flange 547 so that the combination pin 545 is retained therein. Consequently, the combination pin 545 is slidably and rotatably fitted into the interior of the cylindrical housing 535. An optional bearing ball 549 may be fitted into a depression formed in the end 551 of the combination pin 545 to contact the spring 543 and facilitate rotation of the combination pin 545 in the cylindrical housing 535.

The combination pin 545 also has a semicircular cutout 553 having a radius substantially the same as the radius of the semicircular cutout 541 of the cylindrical housing 535. Consequently, when suitably positioned, the cutout 553 is aligned substantially flush with the cutout 541, which allows the detachable pin 505 with the floating bushing 507 to be moved longitudinally within the lock body 501 as described above.

However, in this embodiment, the spring 543 pushes the combination pin 545 against the flange 547. The cutout 553 is positioned on the combination pin 545 so that the cutout 553 is not aligned with the cutout 541 in the cylindrical housing 535, but instead is positioned between the cutout 541 and the end 539. Because the cutout 553 is not aligned with the cutout 541, the combination pin 545 prevents the floating bushing 507 from aligning with the offset cavity 519. As a result, the end of the detachable pin 505 cannot be withdrawn further into the lock body 501. The relative angular and translational positions of semicircular cutout 553 on the combination pin 545 is varied to form different key combinations.

The combination pin 545 also has a keyed portion 555 that extends towards the flanged end of the cylindrical housing 535. In this embodiment, the keyed portion 555 includes a tongue 557 at the exterior end of the combination pin 545. The keyed portion is adapted to be fitted into in a key (not shown) inserted into the flanged end of the cylindrical housing 535, whereby the tongue 557 is received by a groove or slot in the receiving end of the key. The key is rotated, which rotates the combination pin 545, to align the angular position of the cutout 553 of combination pin 545 to the cutout 541 of the cylindrical housing 535. In addition, the length of the receiving end of the key is predetermined so that the key, when fully inserted into the cylindrical housing 535, pushes the combination pin 545 along the longitudinal axis of the cylindrical housing to align the cutout 553 of the combination pin 545 with the cutout 541 of the cylindrical housing 535.

Figure 6A:
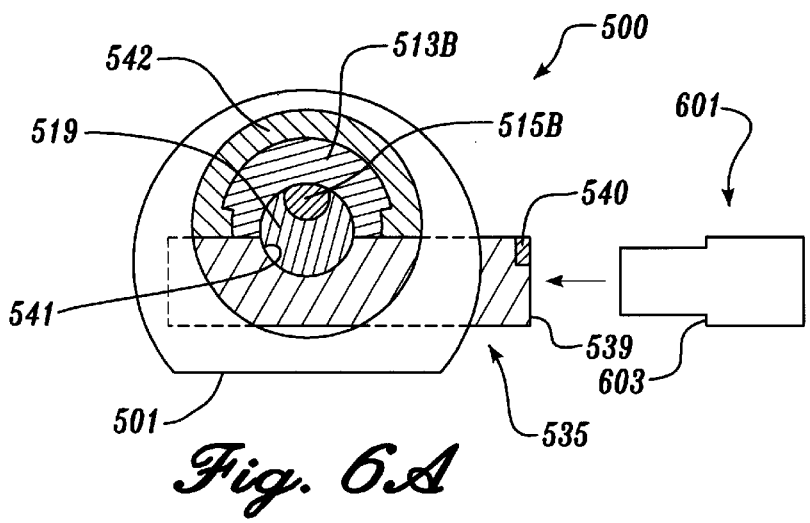
FIG. 6 is an end view of the combination lock depicted in FIG. 5, according to one embodiment of the present invention.
Figure 6B:
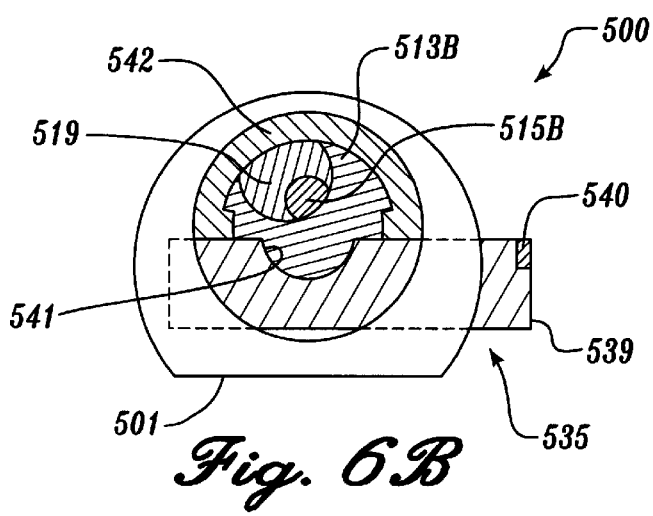

FIGS. 6A and 6B are end views of the combination lock 500 (FIG. 5). As shown in FIG. 6A, the offset cavity 519 of the alignment sleeve piece 503A is angularly aligned with the cutout 541 of the cylindrical housing 535. The cylindrical housing 535 is shown in phantom where hidden by the lock body 501. The detachable pin 505 FIG. 5), including the floating bushing 507, and the combination pin 545 FIG. 5) are omitted for clarity. A key 601 is used to align the angular and translational position of the combination pin 545 when unlocking the combination lock 500. The key 601 is inserted into the end 539 of the cylindrical housing 535 until a shoulder 603 contacts the cylindrical housing 535, thereby limiting the depth that the key 601 is inserted into the cylindrical housing 535. The shoulder 603 is formed on the key 601 so that the key 601, in pushing the combination pin 545 FIG. 5), aligns the cutout 553 (FIG. 5) of the combination pin 545 with the cutout 541 of the cylindrical housing 535. FIG. 6B shows the offset cavity 519 misaligned with the cutout 541. As stated above in conjunction with FIG. 5, the offset cavity 519 cannot receive the floating bushing 507 when the offset cavity 519 is misaligned with the cutout 541, thereby locking the combination lock 500.

Figure 6C:
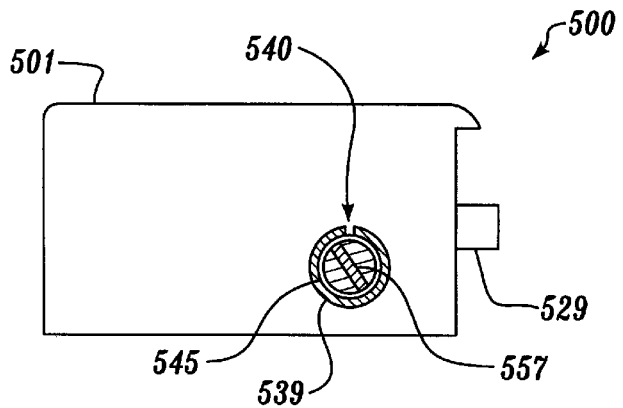

FIG. 6C shows a side view of the combination lock 500 in the locked position. As illustrated in FIG. 6C, the end 529 of the detachable pin 505 (FIG. 5) extends beyond the lock body 501, whereby the end 529 is inserted into a hole in the object to be locked. The end 539 of the cylindrical housing 535 includes the notch 540 for receiving a tooth 607 of the key 601 (FIG. 6A). When key is inserted into the lock 500 so that the tooth 607 is fitted to the notch 540 and the tongue 557 (FIG. 5) of the combination pin 545 is fitted to a slot in the key 601 (as described above in conjunction with FIG. 5), the combination pin 545 is angularly and translationally aligned with the cutout 541 of the cylindrical housing 535.

Figure 7:
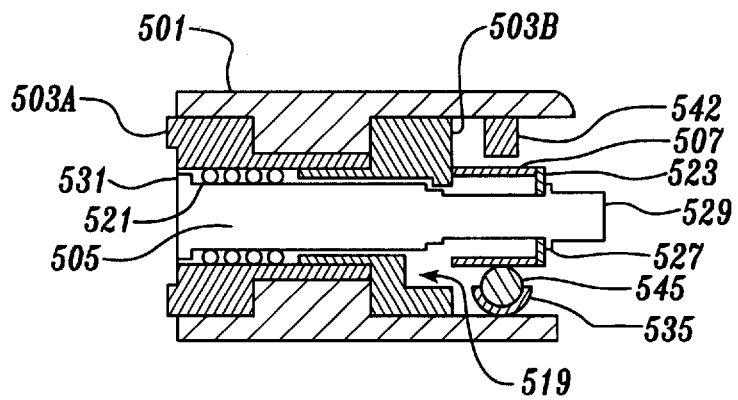
FIG. 7 is a vertical cross-section of a combination lock according to one embodiment of the present invention.

FIG. 7 is a vertical cross-section of the combination lock 500 depicted in FIG. 5 according to one embodiment of the present invention. FIG. 6 illustrates the combination lock 500 with the detachable pin 505 in the locked position (i.e., with the end 529 of the detachable pin 505 extending beyond the lock body 501). Although in this case, the cutouts 541 and 553 (FIG. 5) may be angularly aligned, the combination lock 500 is locked because the combination pin 545 is not translationally aligned. More specifically, the cutout 553 of the combination pin 545 is not aligned with the detachable pin 505. Consequently, the combination pin 545 forces the floating bushing 535 out of alignment with the offset cavity 519, thereby preventing the end 529 of the detachable pin 505 from moving further within the lock body 501. The end 529 extends beyond the lock body 501 in the locked position. As a result, the end 529 extends into a hole in the object to be locked (not shown). In one embodiment (described below in conjunction with FIG. 10) the object to be locked is constrained to move only in a direction perpendicular to the longitudinal axis of the detachable pin and, as a result, the end 529 prevents the object to be locked from moving.

Figure 8A:
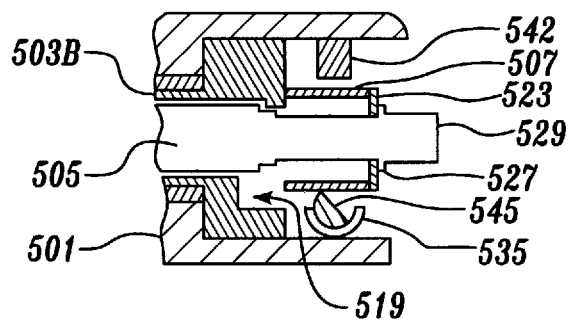
FIGS. 8A–8C are partial vertical cross-sections illustrating the combination lock depicted in FIG. 7 in locked and unlocked conditions according to one embodiment of the present invention.
Figure 8B:
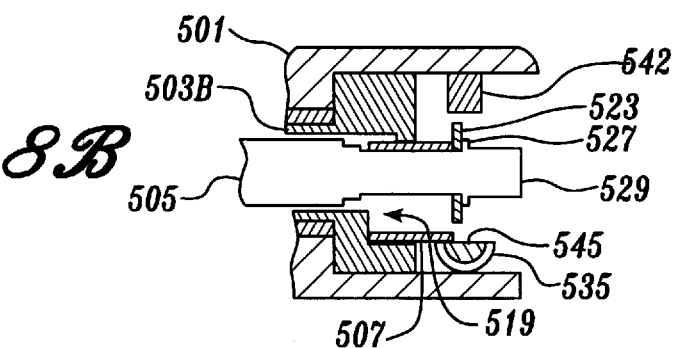
Figure 8C:
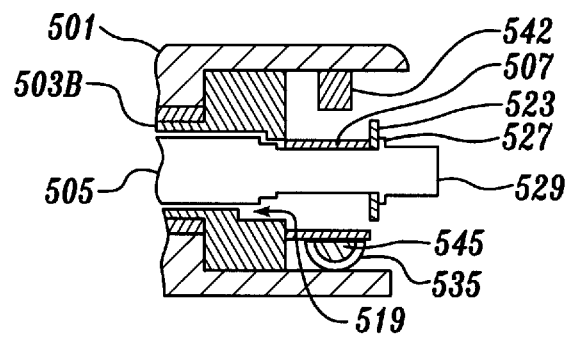

FIGS. 8A–8C are partial vertical cross-sections illustrating the combination lock depicted in FIG. 7 in various locked and unlocked positions according to one embodiment of the present invention. FIG. 8A illustrates the combination lock 500 in a locked position as a result of the combination pin 545 being angularly misaligned with the cutout 541 (FIG. 5) of the cylindrical housing 535. In this case, the combination pin 545 causes the floating bushing 507 to be misaligned with the offset cavity 519 of the alignment sleeve piece 503B. Consequently, the floating bushing 507 contacts the end surface of the exterior end 513B of the alignment sleeve piece 503B. As a result, the alignment sleeve end 503B prevents the detachable pin 505 from being withdrawn further into the combination lock 500.

In contrast, FIG. 8B illustrates the combination lock 500 in a locked position. In this case, the cutout 553 is both angularly and translationally aligned with the cutout 541 of the cylindrical housing 535. Thus, the spring 521 (FIG. 5) provides a force on the detachable pin 505, causing the floating bushing 507 to be fitted into the offset cavity 519 of the alignment sleeve piece 503B. Consequently, the detachable pin 505 is withdrawn into the combination lock 500 by an amount substantially equal to the depth of the offset cavity 519. The depth of the offset cavity 519 is predetermined so that the end 529 of the detachable pin 505 does not extend beyond the lock body 501 when the combination lock 501 is unlocked. Accordingly, the end 529 of the detachable pin 505 is no longer positioned in the hole in the object to be locked.

FIG. 8C illustrates the combination lock 500 in a locked position due to the offset cavity 519 of the alignment sleeve 503 being angularly misaligned with the cutout 541 of the cylindrical housing 535. In this case, because the offset cavity 519 is not aligned with the cutout 541, the floating bushing 507 contacts the end surface of the exterior end 513B of the alignment sleeve piece 503B. As a result, the alignment sleeve piece 503 prevents the detachable pin 505 from being withdrawn further into the combination lock 500.

FIG. 9 is an exploded view of a steering wheel locking device 900 using the combination lock 500 (FIG. 5), according to one embodiment of the present invention. The steering wheel locking device 900 includes a tube 901, a rod 903 and mounting brackets 905 and 907. In this embodiment, the tube 901 is made of a steel tube having an outer diameter of about 25 mm and having an inner diameter of about 16 mm. Thus, a roughly cylindrical hole 908 of about 16 mm in diameter runs longitudinally through the center of the tube 901. The length of the tube 901 is selected as appropriate for the diameter of the steering wheel to be locked. In this embodiment, the tube 901 is about 285 mm long. The tube 901 also includes a conventional dovetail cutout 909 on its outer sidewall centered about 60 mm from an end 911 of the tube 901. The dovetail cutout 909 is sized to receive a corresponding dovetail 913 formed on the bottom surface of the combination lock 500.

The tube 901 also includes a hole 915 located in the dovetail cut 909 for receiving the end 529 of the detachable pin 505 (FIG. 5) when the combination lock 500 is fitted to the tube 901 and placed in a locked condition. The end 529 of the detachable pin 505 extends through the hole 915 and into a depression in the rod 903 (described below), thereby locking the rod 903 in place. Depressions are located on the rod 903 so that the rod 903 can be locked into an extended or retracted position. The tube 901 may optionally include a partially spherical hole 917 communicating with the hole 908 of the tube 901 for receiving a steel ball 919 to implement a ball lock structure. The hole 917 is sized to allow a portion of the ball 919 to extend into the hole 908 of the tube 901, but not allow the ball 919 to pass completely through. The ball lock helps keep the combination lock 500 attached to the tube 901 as follows. The lock body 501 includes a rounded depression (not shown) sized to partially receive the ball 919. When the rod 903 is fitted within the tube 901 with the combination lock 500 attached to the tube 901, the rod 903 pushes the ball 919 radially outwards into the depression in the lock body 501. As a result, the ball 919 prevents the combination lock 500 from sliding along the dovetail cutout 909, thereby securely attaching the combination lock 500 to the tube 901. To remove the combination lock 500, the combination lock 500 is unlocked and the rod 903 is removed.

In addition, the tube 901 may optionally include a hole 920 approximately 50 mm from the end 911 of the tube 901. The hole 920 is sized to received a steel ball 921, similar to the ball 919, implementing a ball guide (described below). The ball 921 rests in rounded depressions in the rod 903 (described below).

In this embodiment, the rod 903 is made of steel and is sized in diameter to smoothly fit within the tube 901. The rod 903 is about 310mm in length and is machined so that a roughly straight groove 922 (shown in dashed lines) is formed along the part of the length of the rod 903 and is sized to allow the ball 921 to roll within. A roughly cylindrical depression 923 is formed in the groove 922 near an end 925 of the rod 903 so that when the rod 903 is fully retracted, the depression 923 is aligned with the hole 915 in the tube 901. A second roughly cylindrical depression 927 is formed in the groove 922 near the opposite end 929 of the rod 903, which aligns with the hole 915 in the tube 901 when the rod 903 is in the fully extended position. The groove 922 runs from about the end 925 to the depression 927. As described above, the detachable pin 505 extends into the depressions 923 or 927 when the combination lock 500 is locked to lock the rod 903 into the retracted or extended positions, respectively. In addition, the rod 903 may also have the aforementioned optional rounded depressions, depressions 931 and 933, in the groove 922 for receiving the ball 921 and implementing the ball guide. The depressions 931 and 933 are located on the rod 903 such that the ball 921 is received in the depressions when the rod 903 is placed in either the extended or retracted position. Thus, the ball guide helps indicate when the rod 903 is properly positioned in the extended or retracted position. The ball guide provides further functionality as described below in conjunction with the mounting bracket 905.

The rod 903 may optionally have a post 935 perpendicularly attached to the rod 903 near the end 925. The post 935 may be threaded and screwed into a threaded hole 936 in the rod 903. Of course, any suitable method may be used to attach the post 935 to the rod 903. For example, the post 935 may be press fitted, welded, brazed, bolted or bonded with adhesive to the rod 903. The post 935 helps prevent the rod 903 from being retracted too far into the tube 901 and to provide a visual indication of the angular alignment of the rod 903 within the tube 901. In addition, optional rounded end caps 937 and 939 may be similarly attached to the ends 925 and 929 of the rod 903, respectively.

The mounting brackets 905 and 907 are fitted to the ends of the tube 901 and respectively have arms 943 and 945 for detachably attaching the tube 901 to a steering wheel (described below in conjunction with FIG. 12). Because each mounting bracket is substantially identical, the following description of the mounting bracket 905 also applies to the mounting bracket 907. The mounting bracket 905 includes a mounting tube 947 having a roughly cylindrical hole 949 longitudinally through the mounting tube 947 that is sized to receive the end 911 of the tube 901. The mounting tube 947 is made of steel and is about 48 mm in length. In this embodiment, the ends of the. tube 901 are machined to have an outer diameter of about 22 mm, which is smaller than the outer diameter of about 25 mm of the intermediate portion of the tube 901. Thus, the hole 949 in the mounting tube 947 is also about 22 mm in diameter. In addition, the hole 949 has a portion with a diameter of about 25 mm extending about 8 mm from an end 951 of the mounting tube 947 for fitting over the intermediate portion of the tube 901 when the mounting bracket 905 is fitted to the tube 901.

A base 953 is formed on the sidewall of the mounting tube 947, having an end 955 aligned with the end 951 of the mounting tube 947. The base 953 is about 25 mm (length) ×20 mm (width)×5 mm (height). The base 953 includes a threaded tap hole 957 used in attaching the arm 943 to the mounting tube 947. The hole 957 is formed through the base 953 and the sidewall of the mounting tube 947, thereby communicating with the hole 949 in the mounting tube 947. In this embodiment, a stud 959 is fitted into a hole 961 in the arm 943 and is sized to protrude about 10 mm from the arm 943. The stud 959 is also threaded at its protruding end 963 so that the stud 959 may be screwed into the hole 957 in the base 953, thereby attaching the arm 943 to the mounting tube 947.

In this embodiment, the end 963 also has a threaded hole for receiving a threaded guide post 965. The guide post 965 includes a socket head 967 that protrudes through the hole 957 and into the hole 949 when the stud 959 is attached to the base 953. The tube 901 includes a J-shaped hole 971 that is aligned with the hole 957 when the mounting tube 947 is fitted to the tube 901. Consequently, the socket head 967 of the guide post 965 is aligned with the J-shaped hole 971 when the mounting tube 947 is fitted to the tube 901. The J-shaped hole 971 communicates with the longitudinal hole 908 in the tube 901. Thus, a wrench can then be fitted to the socket head 967 through the hole 908 within the tube 901 (with the rod 903 removed) to screw the stud 959 onto the base 953. The socket head 967 then protrudes through the J-shaped hole 971 and into the hole 908 of the tube 901. The mounting tube 947 can then be rotated about its longitudinal axis, with the guide post 965 tracking within the J-shaped hole 971, to firmly attach the mounting bracket 905 to the tube 901. Of course, once the rod 903 is inserted into the hole 908, the socket head 967 is inaccessible, thereby securely attaching the mounting bracket 905 to the tube 901. The mounting bracket 907 is attached to the tube 901 in a substantially similar manner, except that the corresponding guide post of the mounting bracket 907 need not have a socket head.

The aforementioned ball guide provides additional functionality in conjunction with the J-shaped holes. The end 951 includes a rounded slot 975 sized to receive the ball 921 of the ball guide. The rounded slot 975 allows the mounting tube 947 to fit over the ball 921 and onto the end 911 of the tube 901. When the ball 921 is not positioned in one of the depressions 931 or 933, the ball 921 is remains within the groove 922 but extends into the slot 947, thereby preventing the tube 901 from rotating about its longitudinal axis. In contrast, when the rod 903 is positioned in either the fully extended or fully retracted position, the ball 921 is respectively received in depressions 931 or 933. As a result, the ball 921 no longer extends into the slot 947, thereby allowing the tube 901 to be rotated within the mounting brackets. Thus, the tube 901 may be rotated to adjust the position of the combination lock 500 to facilitate locking and unlocking. In addition, when the combination lock 500 is unlocked, the end 911 of the tube 901 may be moved away from the mounting bracket 905 along the short end of the J-shaped hole 971, thereby facilitating removal of the tube 901 from the mounting bracket 905.

In an alternative embodiment, the mounting tubes may be deleted and, instead, the arms 943 and 945 are attached to the tube 901 through socket head bolts that are fitted through the sidewall of the tube 901 to threaded holes in the studs of the arms. A wrench can be inserted into the hole 908 within the tube 901 (with the rod 903 removed) to tighten the studs to the tube 901. The interior surface of the tube 901 may include countersinks to allow the rod 903 to be inserted into the hole 908. Once the rod 903 is inserted into the hole 908, the bolts are inaccessible, thereby securely attaching the mounting brackets to the tube 901.

In another alternative embodiment, the rod 903 may include another depression 981 substantially identical to the depression 927 to allow the rod to have a second, longer extended position. In this embodiment, a hole 983 shown in dashed lines is formed proximate to the depression 933 intersecting the groove 922 perpendicularly toward the end 929. A pin 985 is slidably fitted into the hole 983. With the pin 985 fully inserted in the hole 983, the end of the pin extends into the groove 922, thereby preventing the ball 921 from rolling along the groove 922 further towards the depression 927 as the rod 903 is withdrawn to the longer extended position. As a result, the rod cannot be further withdrawn. However, if the pin 985 is withdrawn so as to no longer impede the ball 921, the rod 903 can be further withdrawn in the longer extended position. The depression 981 is placed so as to be aligned with the end 529 of the combination lock 500 when the ball 921 is received in the depression 927. Thus, the pin 985 allows the rod 903 to selectably extended into one of two extended positions.

In still another embodiment, a hole 987 may be formed in the mounting tube 947 to facilitate access to the socket head 967 when attaching the stud 959 to the mounting tube 947. Of course, the rod 903 prevents access to the socket head 967 when it is when inserted in the tube 901. Accordingly, the stud 959 cannot be removed from the mounting tube 947 when the steering wheel locking device 900 is locked. Optionally, silicone covers 987 and 989, respectively, may be added to the tube 901 and arms of the mounting brackets 905 and 907.

Figure 10:
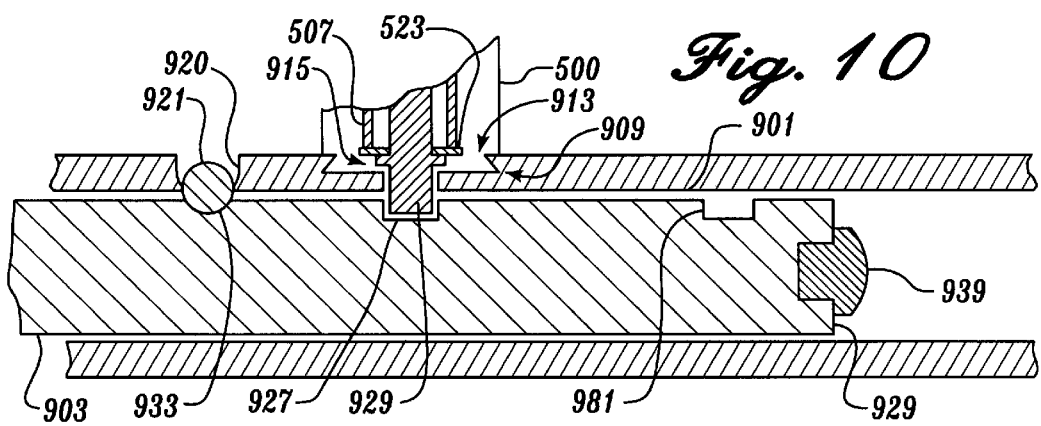
FIG. 10 is a partial cross-section of the steering wheel locking device depicted in FIG. 9 in the locked position.

FIG. 10 is a partial cross-section of the steering wheel locking device 900 FIG. 9) in the locked position. As illustrated in FIG. 10, the rod 903 is extended out of the tube 901, thereby locking the steering wheel in a manner similar to the aforementioned conventional steering wheel locks. The combination lock 500 locks the rod 903 in the extended position by inserting the end 529 of the detachable pin 505 through the tube 901 and into the depression 927 of the rod 903. Thus, the rod 903 is substantially fixed in the extended position within the tube 901.

Figure 11:
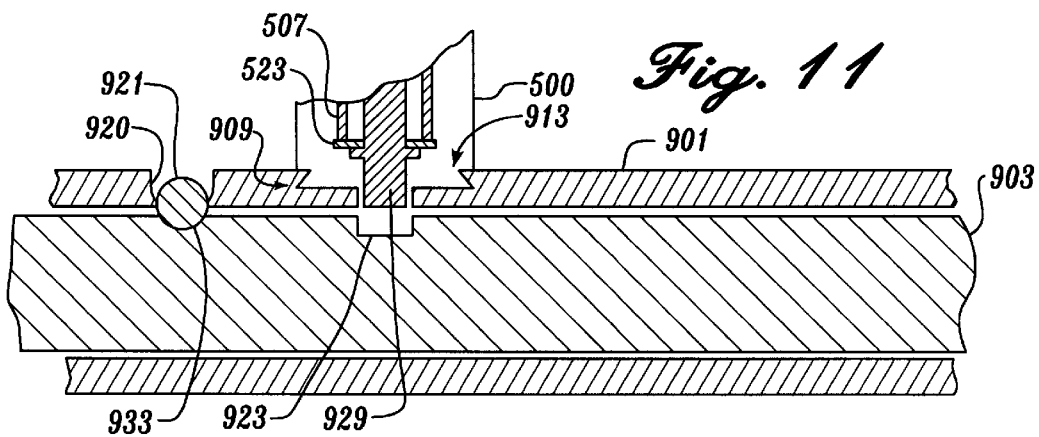
FIG. 11 is a partial cross-section of the steering wheel locking device depicted in FIG. 9 in the unlocked position.

FIG. 11 is a partial cross-section of the steering wheel locking device depicted in FIG. 9 in the unlocked position. The rod 903 is retracted into the tube 901. The combination lock 500 locks the rod 903 in the retracted position by inserting the end 529 of the detachable pin 5Q5 through the tube 901 and into the depression 923 of the rod 903.

Figure 12:
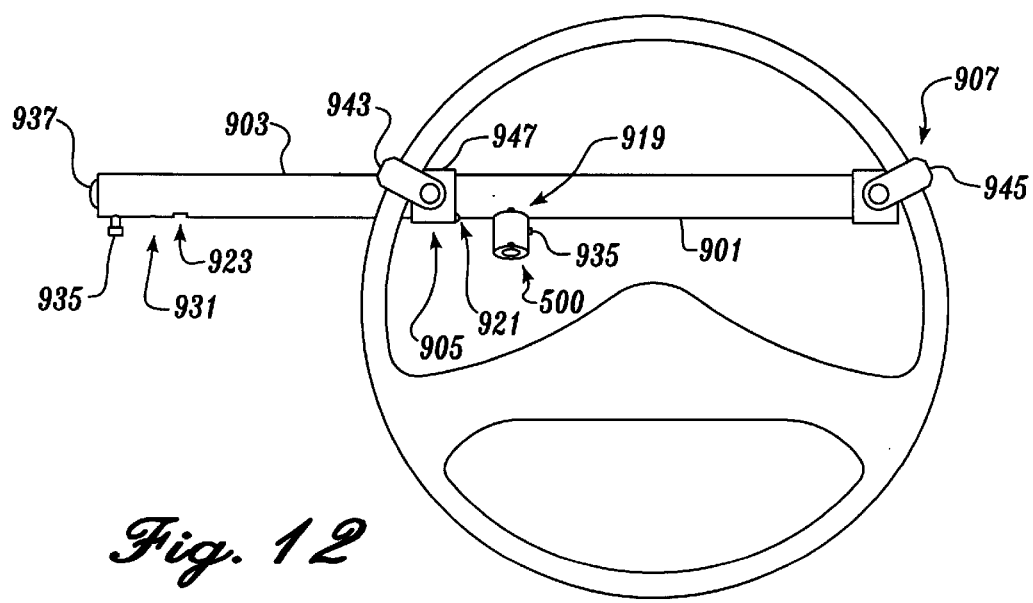
FIG. 12 is a perspective view of the steering wheel locking device depicted in FIG. 9 mounted on a steering wheel.

FIG. 12 is a perspective view of the steering wheel locking device depicted in FIG. 9 mounted on a steering wheel. The tube 901 is attached to the steering wheel through the mounting brackets 905 and 907. The studs of the mounting brackets are partially unscrewed from the base of the mounting tube, so that the mounting tube can be loosely fitted on the ends of tube 901. The curved arms of the mounting brackets are fitted to the steering wheel. Then, the studs of the mounting brackets are screwed tightly to the tube 901 via the guide posts, using a wrench inserted within the longitudinal hole 908 of the tube 901. The rod 903 is then inserted into the hole 908 of the tube 901. The combination lock 500 is then attached to the dovetail cutout on the tube 901. When the combination lock 500 is locked (with the rod 903 either in the extended or retracted position), the rod 903 cannot be removed, thereby making the guide posts inaccessible and securely attaching the tube to the steering wheel.

To lock the steering wheel, the user unlocks the combination lock 500 as described above and pulls the end 925 of the rod 903 out from the tube 901 so that the rod 903 is in the extended position. The user then locks the combination lock 500, thereby securely locking the rod 903 in the extended position. In a manner similar to the aforementioned conventional steering wheel locks, the extended rod 903 prevents the steering wheel from being completely turned, thereby locking the steering wheel. To unlock the steering wheel, the user simply unlocks the combination lock 500 and pushes the rod 903 back into the tube 901 so that the rod is in the retracted position. The user then locks the combination lock 500, thereby securely locking the rod 903 in the retracted position. Because the rod 903 is no longer extended, the steering wheel may be freely turned. Because the steering wheel locking device 900 is left attached to the steering wheel, the locking device 900 is always convenient, unlike conventional steering wheel locks. Further, the locking device 900 eliminates the problem of finding a convenient location to store the device when not being used, which occurs with conventional steering wheel locks.

The embodiments of the multishaft combination lock described above are illustrative of the principles of this invention and are not intended to limit the invention to the particular embodiments described. For example, the combination lock can be used in a non-retractable steering wheel locking device. Conversely, a conventional lock may be used instead of a multishaft combination in the retractable steering wheel locking device. In other embodiments, the tube may be mounted on the steering wheel using other mounting structures or permanently attached to the steering wheel. In still other embodiments, the tube, rod and/or mounting brackets may be covered with a resilient material for protecting the steering wheel and the user. In yet other embodiments, the lock need not be removable. Of course, different materials may be used instead of the materials described above. Accordingly, while the preferred embodiment of the invention has been illustrated and described, it will be appreciated that various changes can be made therein without departing from the spirit and scope of the invention.

I claim:

1. A locking device for attaching to and locking a steering wheel, said device being in an attached state when attached to said steering wheel and disposed substantially parallel to a plane that is perpendicular to an axis of rotation of said steering wheel, said device comprising:
   a tube, said tube having a sidewall with a hole formed therethrough;
   a rod slidably fitted within said tube;
   a mounting bracket having a fastener, said mounting bracket being attached to said tube through said hole of said tube, wherein said fastener is configured to detachably attach said tube to said mounting bracket, wherein said bracket is used in placing said device in the attached state; and
   a lock attached to said tube, wherein said lock is configured to lock said rod in an extended position in a locking state and to retain said rod in a retracted position in an unlocking state.

2. The device of claim 1 wherein said device is configured to such that the device can be in the unlocking state concurrently with the attached state.

3. The device of claim 1 wherein said lock includes a pin having a first end, said lock configured to extend said first end of said pin through the side wall of said tube when said lock is in a locked condition and further configured to withdraw said first end of said pin from said tube when said lock is in an unlocked condition.

4. The device of claim 3 wherein said rod includes a depression for receiving said first end of said pin when said lock is in said locked condition, whereby said rod is prevented from sliding within said tube.

5. The device of claim 1, wherein said lock is detachable attached to said tube.

6. The device of claim 1 wherein, said tube includes a dovetail cutout configured to receive a dovetail on said lock.

7. The device of claim 1 wherein said lock is a combination lock comprising:
   a lock body;
   an alignment sleeve rotatably fixed to said lock body, wherein said alignment sleeve is configured to be rotated about a principal axis of said alignment sleeve, said alignment sleeve having a hole coaxial with said principal axis of said alignment sleeve, said alignment sleeve having a first end positioned within said lock body; and
   a detachable pin with a floating bushing, said floating bushing is configured to be selectively misaligned with a principal axis of said detachable pin, said detachable pin and said floating bushing configured to be inserted coaxially with said principal axis of said alignment sleeve into said lock body through said hole of said alignment sleeve, said floating bushing being positioned beyond said first end of said alignment sleeve when said detachable pin is completely inserted in said lock body, wherein said floating bushing prevents said detachable pin from being removed when said floating bushing is misaligned with said principal axis of said detachable pin.

8. The device of claim 1 wherein said lock is a combination lock comprising:
   a lock body;
   an alignment sleeve rotatably fixed to said lock body, wherein said alignment sleeve is configured to be rotated about a principal axis of said alignment sleeve, said alignment sleeve having a hole coaxial with said principal axis of said alignment sleeve and an offset cavity adjoining said hole of said alignment sleeve, said alignment sleeve having a first end positioned within said lock body; and
   a detachable pin with a floating bushing, wherein said floating bushing is configured to be selectively misaligned with a principal axis of said detachable pin, said detachable pin and said floating bushing configured to be inserted coaxially with said principal axis of said alignment sleeve into said lock body through said hole of said alignment sleeve and said offset cavity, wherein said floating bushing is aligned with said offset cavity when said combination lock is in an unlocked condition so that said floating bushing is configured to be positioned in said offset cavity, whereby said detachable pin is configured to be moved into an unlocked position.

9. The device of claim 1 wherein said tube is configured to be disposed substantially below said bracket when the device is in the attached state.

10. The device of claim 1 wherein said tube has a fixed length.

11. The device of claim 10 wherein said rod is positioned to cover said hole of said tube when said rod is slidably fitted in said tube.

12. The device of claim 10 wherein removal of said rod exposes said hole of said tube.

13. The device of claim 1 further comprising a second mounting bracket attached to said tube, wherein said second mounting bracket is configured to have a fixed position relative to said tube when the device is in the attached state and in the locking state and to have said fixed position relative to said tube when the device in the attached state and in the unlocking state.

14. A method for selectably locking a steering wheel, the method comprising:

detachably mounting a bracket to the steering wheel;

detachably attaching a tube to the bracket by way of a hole formed in a sidewall tube;

slidably fitting a rod within said tube;

selectably retaining said rod within said tube in an first position, wherein said rod is configured to limit rotation of said steering wheel when said rod is in said first position, thereby locking said steering wheel; and selectably retaining said rod within said tube in a second position, wherein said second position of said rod does not limit rotation of said steering wheel, thereby unlocking said steering wheel so that said steering wheel can be normal steered with said tube attached to said steering wheel and said rod retained in said second position.

15. The method of claim 14 wherein retaining said rod within said tube in said second position is performed without detaching said tube from said steering wheel.

16. An apparatus for selectably locking a steering wheel, said apparatus being in an attached state when attached to said steering wheel and disposed substantially parallel to a plane that is perpendicular to an axis of rotation of said steering wheel, the apparatus having a locking state in which the apparatus prevents complete rotation of the steering wheel and having an unlocking state in which rotation of the steering wheel is not impaired, the apparatus comprising:

a tube, said tube having a sidewall with a hole formed therethrough;

a bracket having fastener means for detachably attaching said tube to said bracket through said hole, wherein said bracket is used in placing said apparatus in the attached state;

a rod slidably fitted within said tube;

first retaining means for selectably retaining said rod within said tube in a first position while said apparatus is in the attached state, said apparatus being in the locking state when said rod is retained in said first position; and second retaining means for selectably retaining said rod within said tube in a second position while said apparatus is in the attached state, said apparatus being in the unlocking state when said rod is retained in said second position.

17. The apparatus of claim 16 wherein said bracket is configured to remain coupled to said tube when said rod is retained in said second position.

18. The apparatus of claim 16 wherein said tube is configured to be disposed substantially below said bracket when said apparatus is in the attached state.

19. The apparatus of claim 16 wherein said tube and said rod are cylindrical in shape.

20. The apparatus of claim 16 wherein said bracket is configured to be detachably attached to a first end of said tube, said apparatus further comprising a second bracket configured to be detachably attached to a second end of said tube.

* * * * *

UNITED STATES PATENT AND TRADEMARK OFFICE
CERTIFICATE OF CORRECTION

PATENT NO. : 5,890,382
DATED : April 6, 1999
INVENTOR(S) : K. Wang

It is certified that error appears in the above-identified patent and that said Letters Patent is hereby corrected as shown below:

| COLUMN | LINE | |
|---|---|---|
| 15 | 33 | "I claim:" should read --The embodiments of the invention in which an exclusive property or privilege is claimed are defined as follows:-- |
| 15 (Claim 3, | 58 line 3) | "side wall" should read --sidewall-- |
| 17 (Claim 14, | 3 line 5) | "sidewall tube;" should read --sidewall of the tube;-- |
| 17 (Claim 14, | 5 line 7) | "an first" should read --a first-- |
| 17 (Claim 14, | 13 line 15) | "normal steered" should read --normally steered-- |

Signed and Sealed this

Twelfth Day of October, 1999

Attest:

Q. TODD DICKINSON

*Attesting Officer*     *Acting Commissioner of Patents and Trademarks*